Oct. 18, 1966  F. R. HINCHCLIFF  3,279,851
SEAT BELT POSITIONER
Filed Jan. 22, 1965
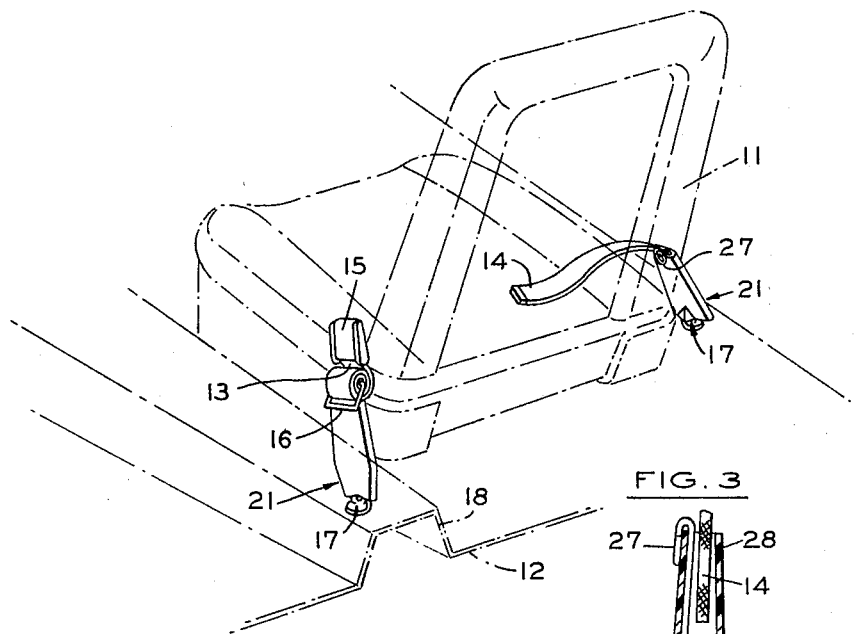
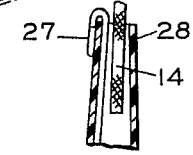
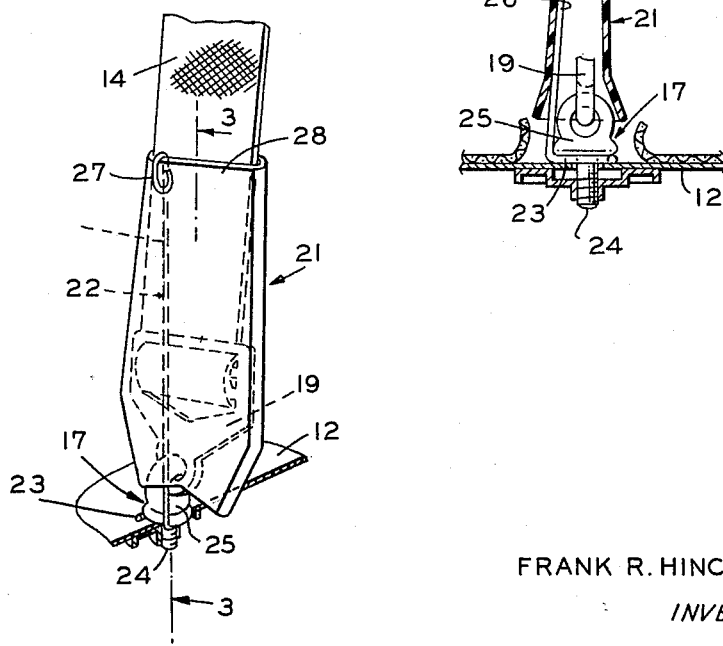
FRANK R. HINCHCLIFF
*INVENTOR*
BY John R. Faulkner
John J. Roethel
*ATTORNEYS*

United States Patent Office 3,279,851
Patented Oct. 18, 1966

3,279,851
SEAT BELT POSITIONER
Frank R. Hinchcliff, Dearborn, Mich., assignor to Ford Motor Company, Dearborn, Mich., a corporation of Delaware
Filed Jan. 22, 1965, Ser. No. 427,398
4 Claims. (Cl. 297—385)

This invention relates to automotive seat belts and more particularly to a device adapted to yieldably hold a portion of a seat belt in a readily accessible position when not in use.

In many automotive seat belt installations, the seat belts are in two sections adapted to be coupled together by a buckle device. The outboard belt section is installed on a body sill or floor section between the door and the seat near the rear of the front seat. An annoyance of considerable magnitude is the inherent tendency of the outboard belt to fall outside of the vehicle. The vehicle can be driven away with the belt dragging on the ground or the door may be closed in such a way that the end of the belt damages the interior trim or upholstery.

It is an object of the present invention to provide a simple device for positioning the seat belt within the vehicle by the seat, where it can easily be reached by the occupant for fastening. In general, the device comprises a formed spring wire or a formed piece of flat spring steel constructed and arranged to be retained by and under the seat belt anchor bolt. The spring wire or flat spring is designed to stand at an angle that will support a boot covering the anchored end of the seat belt section. The spring wire, or flat spring, is designed with a hook at the top end. The hook end clips over the top of the boot and the boot is thus restrained from coming off, falling over, or becoming loose.

Other objects, advantages and features of this invention will become more apparent as the description proceeds, particularly when considered in connection with the drawing in which:

FIG. 1 is a perspective view of an unoccupied vehicle seat (shown in dot and dash outline) illustrating the application thereto of the seat belt positioning device embodying the present invention;

FIG. 2 is an enlarged perspective view of the seat belt positioning device; and

FIG. 3 is a sectional view taken on the line 3—3 of FIG. 2.

Referring now to the drawing, there is shown in dot and dash outline a seat 11 mounted on the floor 12 of a motor vehicle. Shown in operative relationship to the seat 11 is a conventional seat belt comprising an inboard section 13 and an outboard section 14 which are adapted to be connected to each other through a conventional buckle device 15. The inboard belt section 13 is shown with a reel type seat belt retractor 16 mounted thereon which is adapted to maintain the belt section rolled up at the rear corner of the seat when not in use.

The inboard and outboard seat belt sections are anchored to the vehicle floor through conventional eye bolts 17. For exemplification, the inboard eye bolt is shown installed in a substantially vertical wall portion 18 of the drive shaft tunnel in the vehicle floor 12. The outboard eye bolt 17 (see FIG. 2) is shown anchored in a horizontal portion of the floor 12. It will be understood that the reverse might be true, that the outboard belt could be installed in a vertical wall portion of the side sill of the vehicle body and the inboard belt anchored to an eye bolt placed in a horizontal portion of the floor. The ends of the belt sections 13 and 14 are connected to a connector 19 adapted to be coupled or hooked to the eye bolt 17.

Over each assembly of belt end, connector 19 and eye bolt 17 is placed a guard boot 21. The guard boot 21 functions to improve the appearance of the connection between the belt end and the floor, prevents scuffing of the shoes of the vehicle occupants by engagement with the eye bolt, and protects against accidental disengagement of the connector 19 from the eye bolt. As is explained more fully in U.S. Patent 3,126,228 which discloses a guard boot similar to that illustrated in the present drawing, the boot is constructed of plastic, rubber or any "flexible sufficiently resilient material." Because it is constructed of a "flexible sufficiently resilient material" the boot 21 is unable of itself to maintain the seat belt sections in an upright easily accessible position. This is accomplished in the present invention by adding to the foregoing combination of belt end, connector 19, eye bolt 17, and boot 21 a formed spring wire 22. It will be understood that the formed spring wire 12 may be formed of flat spring steel or its equivalent.

In its preferred embodiment, see FIGS. 2 and 3, the formed spring wire 22 has at one end a loop 23 adapted to fit around the threaded end portion 24 of the eye bolt 17 and to be held between the body portion 25 and the floor 12. It will be understood that the angle between the elongated portion 26 of the formed spring wire 22 and the loop 23 may be altered even after installation in the vehicle. The angle selected will be one that will support the boot 21 in its optimum position relative to the vehicle seat and for the passenger's comfort and convenience. It will be also understood that the main portion 26 of the formed spring wire 22 and the loop 23 may lie in a substantially common plane to accommodate installation on the side of the side wall of the driveshaft tunnel or on a side wall of a body sill.

The elongated portion 26 of the formed spring wire 22 terminates in a hook 27 which is adapted to overlie the outer edge and extend downwardly over the outer marginal portion of the upper end 28 of the boot. Since the hook clips over the top of the boot it functions to restrain the boot from coming off, falling over or becoming loose relative to the end of the belt section connected to the eye bolt 17.

The formed spring wire 22 provides several advantages. When used on an outboard belt section such as the outboard belt section 14, it is adapted to hold a sufficient portion of the belt section 14 in a substantially upright position where it is easily accessible when not in use and where it has little likelihood of falling out of the vehicle door to the extent that it would be dragged on the ground. When used on an inboard belt section 13 such as that illustrated, the formed spring wire can be made with sufficient rigidity to support the weight of the belt buckle 15 and the spring reel-type retractor 16.

It will be understood that the invention is not to be limited to the exact construction shown and described but that various changes and modifications may be made without departing from the spirit and scope of the invention as defined in the appended claims.

I claim:
1. In a seat belt assemblage,
a seat belt,
an anchor means secured to a floor member,
a connector between an end of said belt and said anchor means,
a resilient guard boot encompassing said belt end, connector and anchor means,
and a stiffener member extending from said anchor device through said boot to maintain the latter and said belt end in substantially upright and accessible position.

2. In a seat belt assembly according to claim 1, in which:
a loop portion at one end of the stiffener member encompasses a portion of the anchor means,
and a hook portion at the other end engages the extremity of said guard boot.

3. In a seat belt assemblage,
a seat belt,
an eye bolt having a portion threaded into a vehicle body floor member,
a connector secured to one end of said belt and coupled to said eye bolt,
a resilient guard boot encompassing said belt end, connector and eye bolt,
and a formed wire element extending from said eye bolt through said boot to maintain the latter and said belt end in substantially upright and accessible position.

4. In a seat belt assemblage according to claim 3, in which:
said formed wire element has a loop portion at one end encompassing a portion of the anchor means between the latter and the vehicle body floor member,
and a hook portion at the outer end in engagement with the extremity of said guard boot to prevent movement of the latter along said belt away from said eye bolt.

References Cited by the Examiner

UNITED STATES PATENTS

| | | | |
|---|---|---|---|
| 2,868,309 | 1/1959 | Burgess | 297—385 |
| 2,945,275 | 7/1960 | Almeter | 280—150 |
| 3,046,056 | 7/1962 | Greene et al. | 297—385 |
| 3,126,228 | 3/1964 | Greene et al. | 297—385 |
| 3,171,688 | 3/1965 | Nicholas | 297—388 |
| 3,175,862 | 3/1965 | Robbins | 297—385 |
| 3,185,246 | 5/1965 | Maurer | 297—385 |
| 3,199,917 | 8/1965 | Veley et al. | 297—385 |
| 3,241,882 | 3/1966 | Fredericks | 297—385 |
| 3,244,452 | 5/1966 | Veley et al. | 297—385 |

FRANK B. SHERRY, *Primary Examiner.*

JAMES T. McCALL, *Examiner.*